United States Patent [19]

Nam

[11] Patent Number: 4,574,380

[45] Date of Patent: Mar. 4, 1986

[54] SELF-OPTIMIZING ELECTRODE AND PULSE-STABILIZED SUPER HIGH POWER C.W. GAS LASERS

[76] Inventor: Kyong H. Nam, 11130 - 24A Ave., Edmonton, Alberta, Canada, T6J 4Y9

[21] Appl. No.: 445,183

[22] Filed: Nov. 29, 1982

[30] Foreign Application Priority Data

Jun. 24, 1982 [CA] Canada .................................... 405873

[51] Int. Cl.⁴ ............................................. H01S 3/097
[52] U.S. Cl. ........................................ 372/87; 372/85; 372/55
[58] Field of Search .................... 372/85, 87, 83, 25, 372/701, 38

[56] References Cited

U.S. PATENT DOCUMENTS

| | | |
|---|---|---|
| 3,743,881 | 7/1973 | Blaszuk . |
| 3,772,610 | 11/1973 | Foster et al. . |
| 4,005,374 | 1/1977 | Levatter et al. . |
| 4,007,430 | 2/1977 | Fletcher et al. . |
| 4,077,018 | 2/1978 | Fahlen et al. . |
| 4,080,578 | 3/1978 | Farish et al. . |
| 4,096,449 | 6/1978 | Foster . |
| 4,114,114 | 9/1978 | Pressley et al. . |
| 4,145,669 | 3/1979 | Babcock et al. . |
| 4,166,986 | 9/1979 | Hundstad et al. . |
| 4,288,758 | 9/1981 | Seguin et al. ......................... 372/38 |

OTHER PUBLICATIONS

Seguin et al., "Crossed-Tube Fluid Ballasted Electrode Pair for EDL Applications"; *Applied Optics*, vol. 20, No. 13, Jul. 1, 1981.
Seguin et al., "An Efficient Multielement Cathode for High Power Electric Discharge Laser Applications"; *J. Appl. Phys.*, 42(8), Aug. '78.
Seguin et al., "The Photoinitiated Impulse-Enhanced Electrically Excited (PIE) Discharge for High Power CW Laser Appl.; Appl. Phys Lett. (32) 7, '78.

*Primary Examiner*—William L. Sikes
*Assistant Examiner*—Léon Scott, Jr.
*Attorney, Agent, or Firm*—Cushman, Darby and Cushman

[57] ABSTRACT

An electrode assembly and a D.C. glow discharge system incorporating the electrode assembly. The system is stabilized by a lower pulse repetition rate (1 KHz-5 KHz) and power (<5% of sustainer power) than that required for pulse-sustained discharge. It operates with a self-sustained discharge at lower voltage than usual due to lowered work functions, increased secondary emission and effective ionization. The pulse-stabilized discharged provides an extended stable operation suitable for high power gas lasers. A water ballasted electrode unit used therein, having individually ballasted electrode elements with discrete water resistors so formed when water flows, eliminates temporally varying spatial current fluctuations and exhibits such unique characteristics as; providing capacitive coupling for a pulse, and resistive coupling for D.C., and self-optimizing current uniformity with the operating time. The electrode unit includes electrode elements protruding into the discharge volume, enlarging the effective diameter of the electrode elements resulting in a uniform discharge. The electrode unit configuration provides a positive means for removing heat from the cathode fall region, and an economical and efficient means of manufacturing. The electrode unit structural configuration is particularly well suited for a pulse-stabilized glow discharge system and can be scaled up by a building block concept to produce super high power gas lasers. High power laser system employing the discharge principle and electrode units may be referred to as a S.O.A.P. (Self-Optimizing, Abnormal-glow, Pulse-stabilized) laser.

31 Claims, 8 Drawing Figures

SELF-OPTIMIZING ELECTRODE AND PULSE-STABILIZED SUPER HIGH POWER C.W. GAS LASERS

The present invention pertains to gas lasers and, more specifically, relates to an improved super high power pulse-stabilized, C.W. gas laser and self-optimizing electrodes for use therein.

Up to the present time, many scientists and companies throughout the world have been attempting to develop efficient and economical super high power, continuous wave lasers for material processing. However, apparently no one seems to have achieved both objectives coincidentally, prior to the present invention. Some systems are efficient (electron-beam sustained) but not economical, while others are economical but not efficient (pulse-sustained) lasers.

The following papers provide information on earlier art. J. P. Reilly, "Pulser-Sustainer Electric Discharge Laser", *J. Appl. Phys.*, Vol. 43, No. 8, p3411, August 1972. A. E. Hill, "Continuous Uniform Excitation of Medium Pressure $CO_2$ Laser Plasma by Means of Controlled Avalanche Ionization", *Appl. Phys. Lett.*, Vol. 22, No. 12, p670, June 1973. H. J. J. Seguin, K. H. Nam and J. Tulip, "An Efficient Multielement Cathode for High Power Electric Discharge Laser Applications" *J. Appl. Phys.*, Vol. 49, No. 8, p4566, August 1978. Kyong H. Nam, Herb J. J. Seguin and John Tulip "Operational Characteristics of a PIE $CO_2$ Laser", *IEEE J. Quant. Elec.*, Vol. QE-15, No. 1, January 1979. U.S. Pat. No. 4,288,758 issued Sept. 8, 1981.

The applicant discusses in depth in his PH.D thesis "A Kilowatt P.I.E. (Photo-initiated, Impulse-enhanced, Electrically-excited) $CO_2$ C.W. laser" which is available at the University of Alberta library and at the National Library in Ottawa, the principle of the pulse-stabilized glow discharge laser in which a laser pumping power source generates the major part of the electrons and the pulse discharge stabilizes the self-sustained glow discharge.

This pulse-stabilized glow discharge system should not be confused in its operating principle with an electron-beam-sustained system or especially with a pulse-sustained discharge system. Because the electron-beam system supplies external electrons into the discharge volume without imposing any electric field upon it, all of the supplied or produced electrons are available to the sustainer power source. Conversely, the electron-ion-pairs generated in a pulse discharge are subjected to their own electric field and a significant amount of the electrons are collected for the pulse duration (typically 250 ns.). In a typical 50 torr laser gas mixture with E/N value of $2 \times 10^{-16}$ v-cm$^2$ where E is electric field intensity in v/cm., and N is particle number density in particles/cm$^3$ (in this case gas molecules), the electron drift velocity is in the neighborhood of $2 \times 10^6$ cm/s. Assuming that the discharge electrode gap is 10 cm, the pulse generated electrons will be depleted to zero within 5 $\mu$s after the pulse. There are still slow moving ions in the discharge volume, but direct contribution to the sustainer current or pumping is not significant. However, during the recombination period, secondary electrons are generated by inelastic collisions. Consequently the depletion rate of the pulse affected electrons becomes smaller; yet it requires a pulse rate of more than 50 KHz, with very high pulse input power, for a stable discharge. As pulse power becomes significant, pulse discharge itself readily initiates an instability and E/N value becomes too low for efficient pumping. The optimum E/N value is $2.2 \times 10^{-16}$ v-cm$^2$ and this is obtainable by self-sustained glow discharge.

The complexities of the electron-beam and pulse-sustained systems are eliminated by the "pulse-stabilized glow discharge system" of this invention. In this system, a self-sustained glow discharge is obtained at much lower discharge voltage than with true self-sustained discharge. This is accomplished by superimposing low pulse repetition rate (PRR) pulses (more than an order of magnitude smaller than the required PRR for the pulse-sustained system: 1 KHz–5 KHz) on the self-sustained discharge. The pulse discharge then improves the glow discharge and extends the self-sustained glow stability as follows:

Repetitive gas conditioning is achieved by energetic electrons with an interval shorter than the time required for a uniform discharge to form localized thermal instability in the gas discharge which is about 1 ms.

The electrode surface is continuously conditioned by the repetitive electron stream leaving the cathode surface and positive ion bombardment on the cathode surface allowing more uniform discharge.

Thus, established uniform glow on the cathode surface takes a much longer time than the pulse period to collapse into a spark discharge or to terminate. Consequently, the glow persists until the next pulse. The positive ions produced by a pulse discharge move toward the cathode much more slowly through the sustained electric field and establish an electrostatic field outside the cathode surface lowering the work function significantly. Under normal laser operation, the He, $N_2$ and $CO_2$ ions take about 0.4 ms, 1.2 ms and 1.4 ms respectively to cross the 10 cm electrode gap. This indicates that some of the ions outlive the pulse period when the PRR is more than 1 KHz thus lowering the work function until the next pulse is generated. Furthermore, the positive ions produced by the glow discharge are accelerated by the pulse field and secondary emission is increased. The pulse discharge also lowers the photo electric work function by setting up quasi glow on the cathode surface.

Finally, the pulse energy ionizes much more effectively the gas under glow discharge because more electrons are available for multiplication and there are more excited atoms and molecules in the gas before onset of the pulse discharge. It should be recognized that because many excited molecules are lost by dissociation and ionization under pulse discharge, the PRR should be as low as possible.

For the reasons mentioned above, the pulse-stabilized glow discharge system works as a self-sustained discharge at substantially lower voltage than true self-sustained glow discharge. This is completely different from pulse-sustained laser operation in which the ionization is produced by the pulse discharge and laser pumping is produced by sustainer discharge.

Recently U.S. Pat. No. 4,288,758 was issued in the names of Herb J. J. Sequin, John Tulip and Kyong H. Nam on a pulse-sustained, electrolytic ballasted, medium high power laser system. This is simpler than the electron-beam-sustained system and more efficient than the resistor ballasted, self-sustained system. However, the system and the cathode are not suitable for a super high power laser for the following reasons.

1. In order to achieve a pulse-sustained mode of operation a significant amount of pulse power or very high PRR pulses are required.

2. In the cathode the water channels are transverse to the gas flow so that there is no easy way of compensating the resistance gradient of the ballasting water (water here represents tap water or aqueous solution) caused by the water temperature gradient in its flow direction. The decreasing resistance with the increasing water temperature always starts instabilities from the water downstream side.

3. In the cathode electrode elements in the form of a row of pins transverse to the gas flow and lying in the same channel interact with the neighboring pins under electric discharge. Also, gas bubbles generated by electrolysis action add up and create non-uniformity in the gas discharge; bubbles generated under arc condition diffuse easily so that arc suppressing ability is reduced; more bubbles cross the water gap by the electrolysis action causing temporal fluctuations in the current and a large amount of bubbles accumulates around the pins causing poor thermal cooling, increased ballasting loss and consequent total current reduction.

4. With solid pins there is no proper way of removing excessive heat generated in the vicinity of the cathode fall region.

5. With the pins mounted flush with the heat shielding plate, the discharge uniformity and stability are degraded as explained hereunder in describing the electrode of the invention.

6. The complication in making and mounting the clamping collars makes the cathode unit uneconomical to manufacture.

7. The seal leaks easily with minimal heating.

It is therefore an object of this invention to provide a highly efficient and economical pulse-stabilized glow discharge system for super high power gas lasers for industrial metal processing.

It is also an object of this invention to provide a better means of circulating the gas for a laser system.

It is also an object of this invention to provide an electrode which self-optimizes the discharge current uniformity by means of discretely water ballasted electrode elements.

It is also an object of this invention to provide an electrode unit which provides capacitive coupling for pulses and resistive coupling for D.C.

It is also an object of this invention to provide an electrode that enlarges the effective diameter of the electrode elements in the discharge.

It is also an object of this invention to provide an electrode which removes the heat from the cathode fall region effectively.

It is also an object of this invention to provide means of making a water ballasted electrode vacuum-tight very economically.

It is also an object of this invention to provide an electrode which eliminates problems encountered with conventional water ballasted electrodes such as water and gas down-stream effect, leaking, interactions with neighboring electrode elements, temporal spatial variations of the discharge current, excessive bubbles crossing the water gap, and impedance changes due to stationary bubbles.

Accordingly there is provided an electrode assembly for a high power gas laser comprising a plurality of elongate metal electrode elements, a dielectric block in which said electrode elements are supported, a heat shield plate adjacent said dielectric block, said electrode elements extending from said dielectric block and passing through corresponding apertures in heat shield plate, a plurality of channels in said dielectric block, electric conductors located in the channels, the electrode elements extending into the channels and longitudinally along a portion of the walls thereof, and spaced from said electric conductors, liquid electrolyte filling the channels and acting as ballast resistors for said electrode elements, and means to circulate said electrolyte through said channels.

There is also provided a method of manufacture of an electrode assembly comprising the steps of forming the dielectric block to the required size and shape, drilling holes from said first major face for said transverse channels, drilling holes from one of said side faces for said main inlet and outlet channels, drilling holes from one of said end faces for said branch inlet channels to connect with said main inlet channel and said branch inlet channels, drilling holes from the other of said end faces for said branch outlet channels to connect with said main outlet channel and said branch outlet channels, drilling two holes in said second major face to connect with said second main inlet and outlet channels respectively for external connections, inserting said main busbar into one of said main channels and said sub-busbars into said corresponding branch channels, connecting said sub-busbars to said main busbar, inserting rubber tube seals in said transverse channel holes between said first major face and said branch channels adjacent said first main face, inserting said electrode elements through said rubber tube seals into said transverse channels, plugging the entrances of the holes for the main and branch channels with plastic rods and rubber tube seals, attaching sealed-in connectors for electrolyte inlet and outlet in said second major face, attaching a sealed-in electrical plug connected to said main busbar.

These and other objects of this invention will be understood from the following description taken with reference to the attached drawings, wherein.

Figure 1:
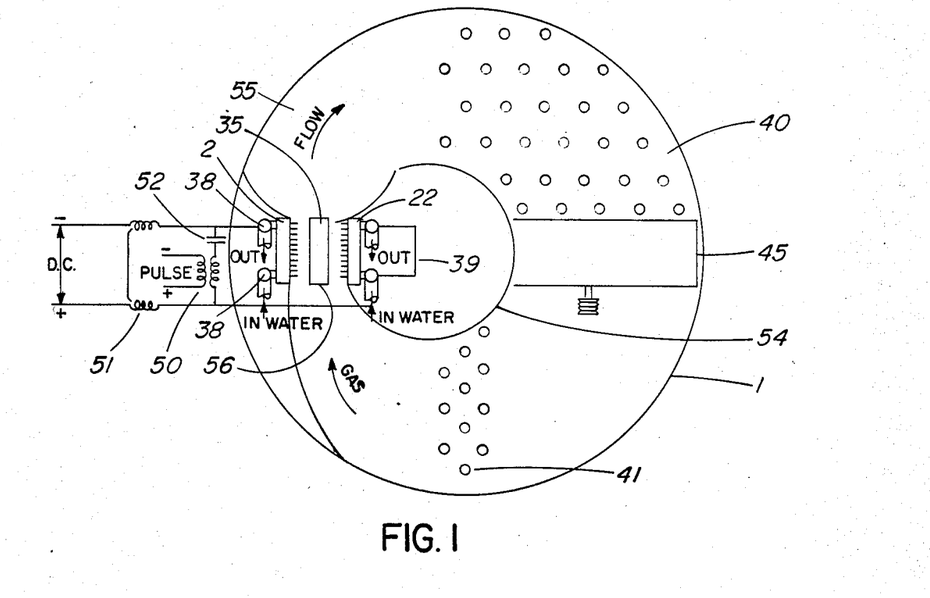
FIG. 1 is a diagrammatic view of a preferred embodiment of the pulse-stabilized laser system.

Referring to drawings, FIG. 1 shows a diagrammatic form of a preferred embodiment of a super high power, pulse-stabilized glow discharge laser system. Hermetically sealed tank 1 encloses a anode structure 38 made to accept anode units 2, cathode structure 39 made to accept cathode units 22, main heat exchanger 40, flow conditioning heat exchanger 41, axial blower 45, flow guide 54, after nozzle 55 and optic system 56 comprised of a set of mirrors located at both ends of the discharge space between the electrode units.

A natural circulation is established under electric discharge conditions by gas heating in the discharge volume 35 and gas cooling at the heat exchangers 40 and 41. This improves the blower efficiency. The flow uniformity is achieved by the long flow distance between the blower outlet and the discharge volume in cooperation with the flow conditioning heat exchanger. The expanded flow region, after nozzle 55, serves as a quenching nozzle for the stream of hot electrons by dispersing and reducing electron number density in that region.

The pulse is connected to the electrode structures through the D.C. blocking capacitor 52 and a D.C. power supply is connected to the electrode structures through pulse isolation inductors 51. Both pulse and D.C. supply are floated to minimize the corona discharge to the tank so two separate inductors are needed.

Figure 1A:
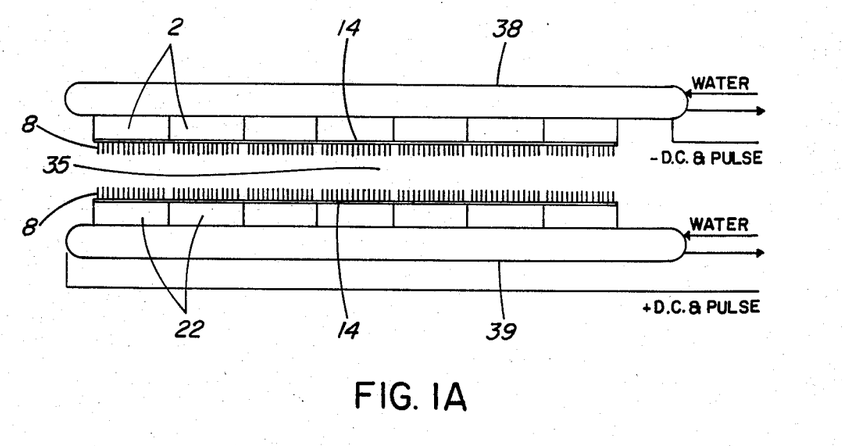
FIG. 1a is an illustration of the preferred electric connection to the electrode structures.

As shown in FIG. 1a the electric connections should be made to the opposite ends of the respective electrode structures; negative polarity is connected to the near end of the cathode structure and positive is connected to the far end of the anode structure or vice versa. If connections are made from one end, the pulse energy takes about 15 ns to get to the other end of a 4 m long electrode structure for a 25 KW C.W. laser. This delay time is comparable to the rise time of the pulse and most of the pulse energy is dumped into the volume near to the connections and a discharge non-uniformity results.

Figure 2:
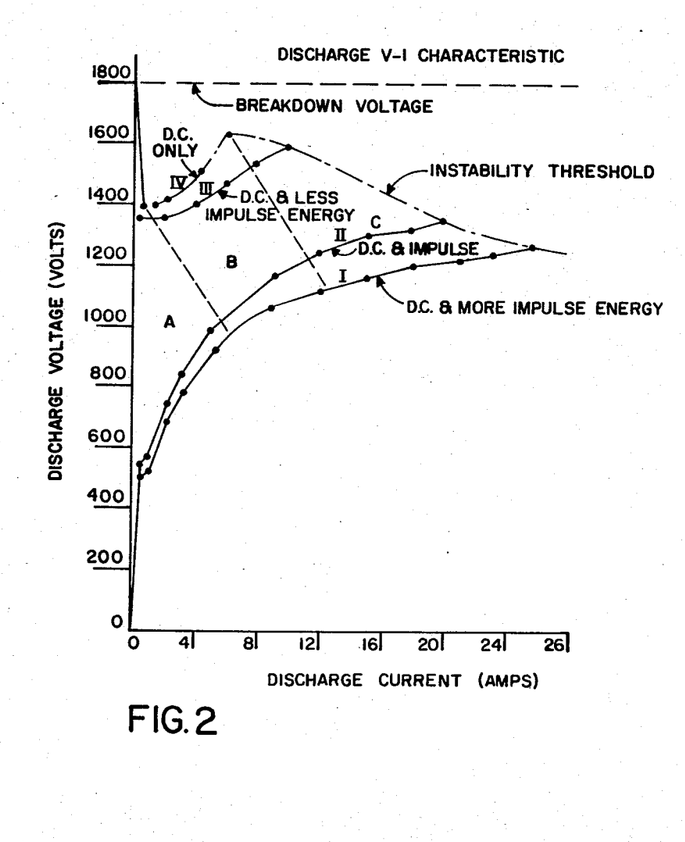
FIG. 2 is a graph showing V-I characteristic curves for different modes of operation.

As the pulse voltage is sufficiently high for a D.C. glow discharge to be ignited, the V-I characteristic curves do not go through a Townsend breakdown process as shown in FIG. 2. The D.C. glow discharge ignited by such pulse discharge goes briefly through a quasi pulse-sustained mode, region A, in which the pulse power is at least greater than 25% of the D.C. sustainer input power. The fact that the current density continuously grows with the increasing voltage indicates the process is abnormal glow in the self-sustained glow discharge. Further discussion will be made about the abnormal glow under the electrode description. Both B and C regions are important pulse-stabilized glow discharge modes in which the sustainer dominates electron generation and laser pumping. If pulse discharge is removed from region B on curve II, the sustainer discharge will end up on curve IV which is a true self-sustained glow discharge, and if it is removed from region C on curve II, the discharge will end up on the stability threshold line that is obtained by joining the maximum discharge points for different stabilization conditions. This threshold line will be pushed upward gradually with the operating time thanks to the self-optimizing characteristic of the electrode of the invention. As the threshold improves the system will work as a true self-sustained glow discharge system. However, the extended stability with greatly improved input power by a small amount of pulse power (<5% of the D.C. power) makes the pulse-stabilized glow discharge system suitable for very efficient and economical super high power lasers.

Figure 3:
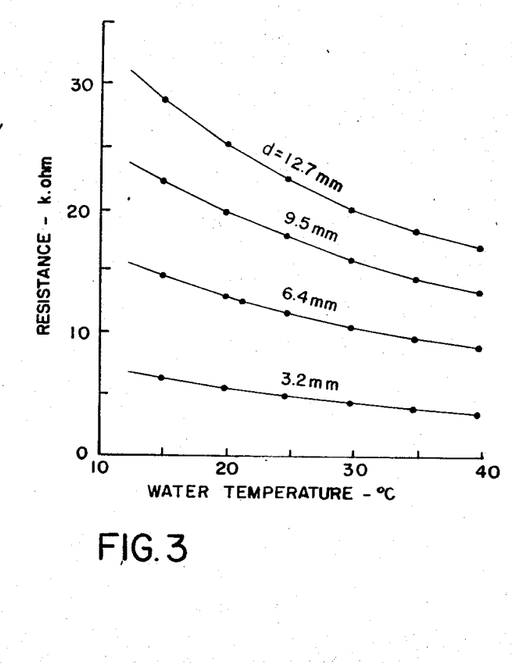
FIG. 3 shows resistance vs. temperature curves for tap water.

FIG. 3 shows the temperature dependent resistance of the tap water used for the electrode ballasting. This explains how the electrode elements in the water downstream initiate instabilities, and suggests the possibility of using the temperature to control the total resistance of the electrode system.

Figures 4, 4A:
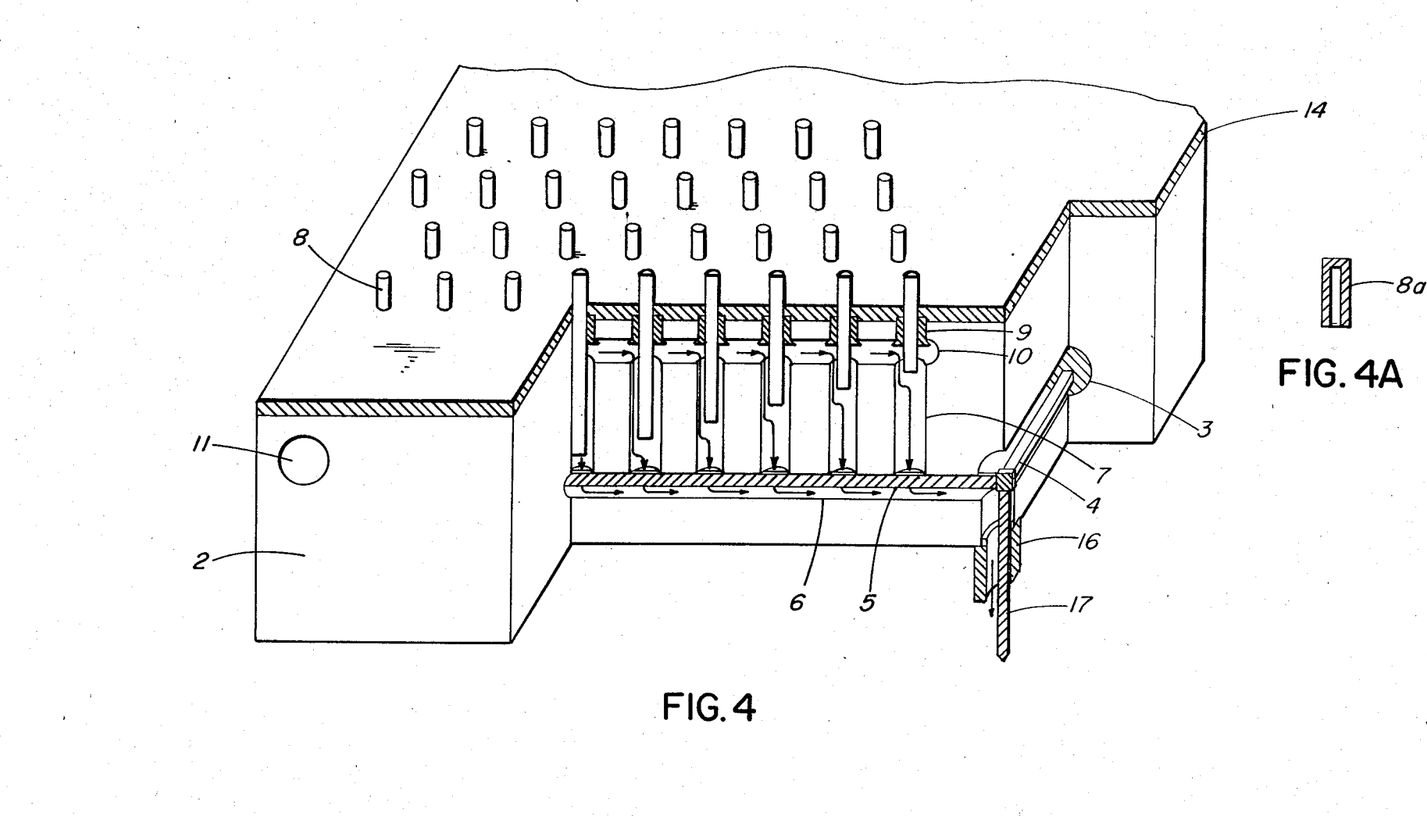
FIG. 4 is a partially broken pictorial diagram of a preferred embodiment of the electrode of the invention.
FIG. 4a is a diagrammatic view of a vertical cross-section of another type of an electrode element.

FIG. 4 shows an embodiment of the electrode of the invention for use in high power gas lasers, especially in pulse-stabilized super high power gas lasers. This electrode unit consists of a six-sided dielectric main body 2, 3-dimensional array electric distribution system comprised of a main busbar 4, sub-busbars 5, electrode elements 8, and tube seal 9, 3-dimensional array of water passages composed of a main inlet channel 11, a main outlet channel 3, branch inlet channels 10, branch outlet channels 6, and transverse channels 7, a cast heat shield 14, water outlet connector 16 and power plug-in connector 17.

A possible replacement of the solid pin, 8a, shown in FIG. 4a is a piece of tube with the upper end blocked to improve the cooling efficiency.

Figure 4B:
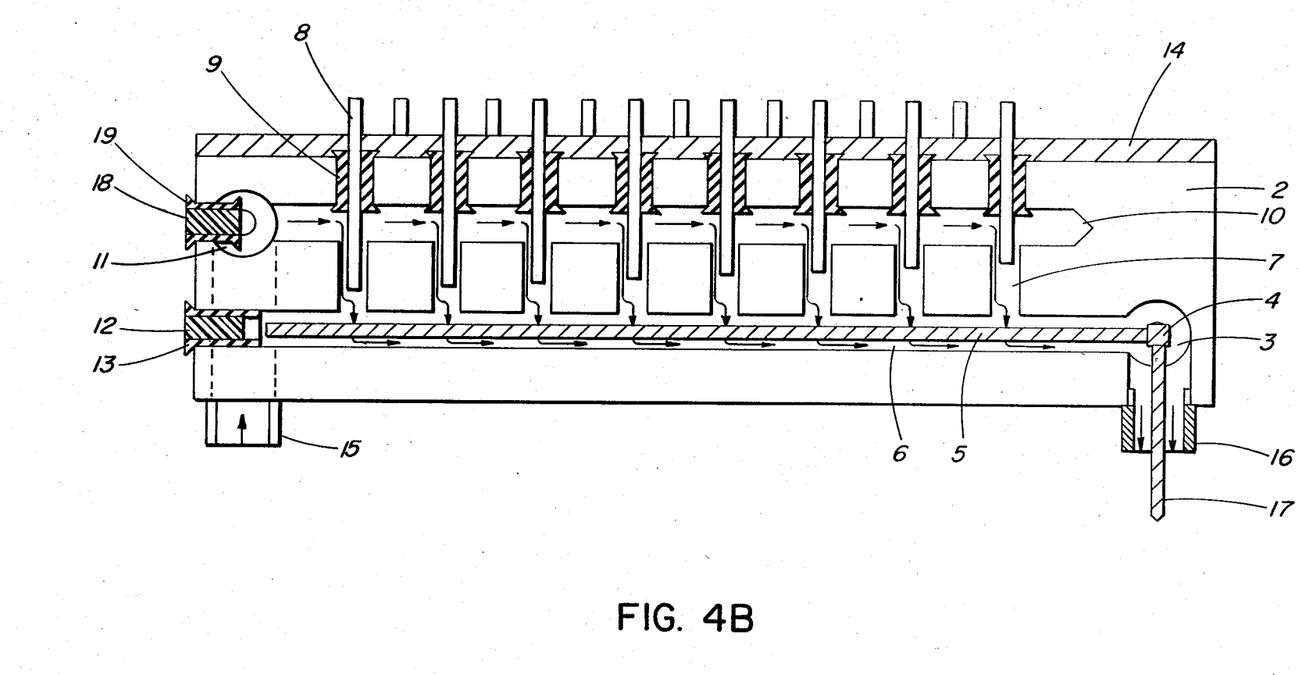
FIG. 4b is a vertical sectional view of the electrode unit of FIG. 3.

A cross sectional view of the electrode of FIG. 4 is shown in FIG. 4b. It shows the water inlet connector 15, and two sets of seal units 12 and 13 and 18 and 19.

All of the water passages are drilled circular holes and all of them are plugged with latex (surgical) tubes or equivalent rubber tubes and the tube inner holes are plugged with suitable materials, metal for transverse channels and dielectric material for the rest of the holes. As this sealing method simplifies the electrode manufacturing process enormously and provides an outstanding vacuum seal, this electrode is more economical than other conventional electrodes. The tube seal is held in place by a small amount of a suitable adhesive such as cyano acrylate polymer glue or the water end of the tube which is expanded and age hardened, or steps or notches in the wall of the channels.

The electrolyte employed may be an aqueous electrolytic solution containing, for example, $K_2CO_3$ or, alternatively, may be ordinary tap water. A solution containing $K_2CO_3$ is distilled water provides a very clean performance and for this reason it is preferred especially where distilled water is readily available. However, in field applications tap water may be found to be a good substitute because it is easily and economically obtainable. One disadvantage so far found with tap water is the formation of a jelly-like substance about the electrode elements after a lengthy period of operation. The initial water gap must be adjusted to be compatible with the electric conductivity of the electrolyte employed. Hereinafter, the term "water" is intended to include either an aqueous electrolyte solution or tap water unless otherwise specified.

The operation of the electrode of the invention is as follows. Water is forced from the source main(electrode structure) into a main inlet channel 11 via water inlet connector 15, distributing the water into branch inlet channels 10 which in turn distribute the water into transverse channels 7, forming discrete water resistors between electrode elements 8 and sub-busbars 5. The water and the bubbles generated under electric discharge are collected by branch outlet channels 6 and eventually voided into main outlet channel 3, which is connected to outlet main or electrode structure (38 or 39 in FIG. 1) when electrode unit 2 or 22 is used as a plug-in unit. The water passages formed as above make the amount of watrer flowing through each transverse channel the same because the flow impedance is the same.

The electrode element 8, plugging the inner hole of the tube seals 9, extends into the transverse channels with predetermined length for each row to compensate the gradients of plasma and water impedances in the gas flow direction; however, it should be noted that the water temperature gradient is minimized with this electrode unit.

A different design can bring the same results in compensating the impedance gradients. Instead of making the electrode element protrusions in the water different, the sub-busbars can be tilted to provide a gradual water gap increase toward the gas downstream portion of the electrode assembly.

This electrode unit can be used as a cathode, anode or cathode-anode pair. When it is used as a cathode, current distribution takes place from the power supply through the main busbar and sub-busbars. The current continues toward the electrode elements via ion-dominated carriers in the water of the transverse channels. These water resistors connected in parallel to the power source via water-metal interface distribute the current into the discharge volume in the same manner as in the conventional multi-pin electrode discharge system. If the electrode unit is used as an anode the distribution process is reversed.

These discrete water resistors have all of the advantages of their conventional counterparts and much more, so that this electrode unit is believed to be the only efficient electrode for a pulse-stabilized glow discharge system for high power lasers. Generally ion-dominated carriers exhibit a large impedance to impulse due to their low mobility and inertia. However, the discrete water resistor with water as a conducting medium acts like a small capacitor (typically about 5PF with this design) for the fast rising impulse, thus the pulse discharge becomes much more uniform with much less loss through the ballasting resistors than their conventional counterparts. Such capacitive coupling of impulse is attributed to the high dielectric constant of water. On the other hand the slow part of the impulse and D.C. potential see a resistor whose resistance decreases with the increasing temperature. This characteristic can be used to control the total resistance of this electrode system.

As heavy ions carry the current, it is expected that a sudden change in steady current due to internal or external causes will be hard to occur. Especially for the glow discharge this characteristic works very well. The discrete water resistors eliminate the bubble problems chronically encountered in the conventional water ballasted electrode. There is no electric discharge interaction among neighboring electrode elements in the water. The electrode elements are cooled effectively because the bubbles are carried away from the electrode currents by the water stream. This water flow direction reduces the amount of the bubbles crossing the water gap and consequently the temporal current fluctuation is reduced ($O_2$ accumulates around the anode in the stagnant water).

If bubbles are allowed to accumulate around electrode elements or sub-busbars as in the electrode used in the previous art it will reduce the total current density. If they are allowed to bunch up in the water gap then spatially varying temporal fluctuation in local current density will result. These problems are completely eliminated by the arrangement of discrete water resistors and the sub-busbar located right against the transverse channels in the branch outlet channels.

The uniformity and stability of the gas discharge with these electrode units depend partially upon the electrode elements protrusion in the discharge volume. As mentioned earlier the discharge process is mainly abnormal glow in which current density increases with the increasing discharge voltage. In the glow discharge if the cathode surface perpendicular to the bulk electric field (the electric field from cathode to anode) is used up, a transition occurs from normal glow to abnormal glow by spreading the glow onto the side and back of the cathode, or if these areas are not available then increasing the glow intensity, or both processes may occur at the same time in different degree. If the electrode elements are mounted flush with the heat shield the abnormal glow process intensifies the glow luminosity at the tips of the electrode elements. Then the localized current density increases rapidly resulting in early stage instability and discharge non-uniformity.

When the electrode elements protrude by the proper amount (4–10 mm) most of the abnormal glow occurs on the side walls. As electrons are emitted perpendicularly from the surface, this glow disperses electrons into a large volume, consequently the effective diameters of the electrode elements become enlarged. Since the voltage required for intensifying the glow luminosity is larger than that required for spreading the glow, all of the properly protruded electrode elements are covered by the glow sooner or later. This effect is accentuated by the pulse discharge and the instability threshold increases and discharge or laser gain becomes very uniform. However, the protrusion cannot be too large. When there is no limit in surface area, some electrode elements produce the glow very easily while others show little or no activity. This results in nonuniform discharge and degrades performance.

Temporally and spatially steady current obtained with the above improvements conditions the electrode unit for better performance as follows. The effective water resistance, R, is expressed by, $$R=d/(A\sigma)$$

where d is the effective mean water gap distance, A is the effective discharge surface area and $\sigma$ is the conductivity of the water determined by carrier density, water temperature, the ballasting passage hole characteristic and the flow condition. The conductivity is assumed to be constant for the same operating condition, however, the electrode elements continuously corrode and erode away by the electrolysis action, consequently d becomes larger and A becomes smaller with operating time. Initially some electrode elements carry more current than others and corrode away faster, resulting in a more rapid rate of increase of d and decrease of A than in the other elements. Thus, for elements which initially carry higher current the resistance increases according to the above equation and the current decreases more to equalize with the other elements. Therefore the electrode unit adjusts itself to any discharge conditions and self-optimizes the current distribution with the operating time. This self-optimization is so significant that input power to the plasma improved many times the initial value with about 500 hrs. operation in some cases.

Figure 5:
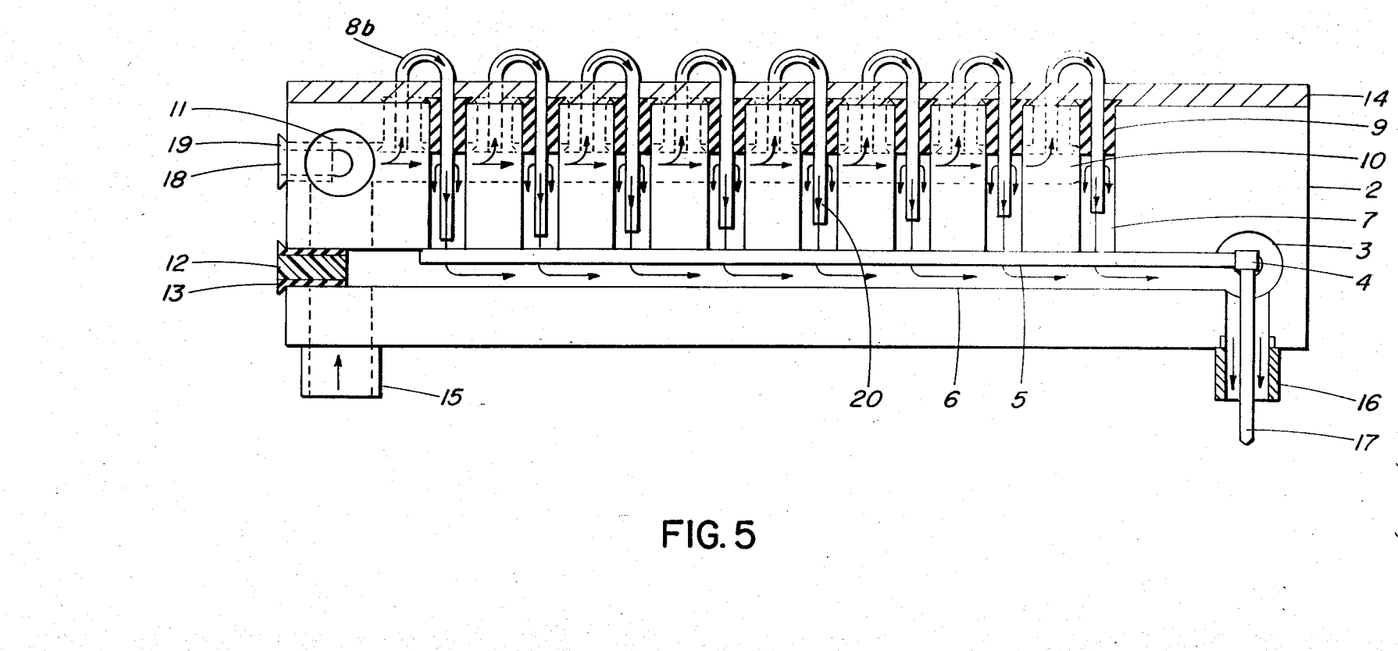
FIG. 5 is a vertical sectional view of another type of electrode unit.

FIG. 5 shows another form of the electrode unit which provides a positive cooling means. It is similar to that of FIG. 4 in operational principle and construction except for several modifications, the electrode elements are bent tubes 8b, joining two neighboring columns, (a column is defined as a group of electrode elements arrayed in gas flow direction) to distribute water from a branch inlet channel of one column to the transverse channel of the other column. The water voids into the branch outlet channels and discharges in the same manner as explained for the previous electrode unit. In some applications, the communicating grooves or holes 20 can be provided to force out any bubbles that might hang around electrode elements otherwise. The electrode elements are mounted with an angle in the gas flow direction with the water down-stream end positioned higher to facilitate the water flow. This electrode design eliminates the branch outlet channels from the odd columns and branch inlet channels from the even columns or vice versa.

In a gas discharge most of the heat is generated in the vicinity of the cathode fall region and continuous discharge may heat up the heat shield 14 and gradual gas contamination may build up. Therefore this electrode unit is more suitable for cathode application to remove the heat effectively from the cathode fall region.

The high power laser system described above may be referred to as a S.O.A.P. (Self-Optimizing, Abnormal-glow, Pulse-stabilized) laser.

The following is an exemplary method of manufacture of an electrode unit.

1. Machine or otherwise form dielectric block to size.
2. Drill holes for transverse channels (7).
3. Drill holes for inlet and outlet branch channels (10 and 6 respectively).
4. Drill holes for main inlet and outlet channels (11 and 3 respectively).
5. Drill holes for water inlet and outlet connectors.
6. Provide square stainless steel bar for the main busbar with threaded holes for location of sub-busbars.
7. Provide stainless steel rods with threaded ends for the sub-busbars.
8. Provide rubber tubing of proper size for sealing.
9. Provide electrode elements of stainless steel formed to appropriate length and shape in accordance with one of the embodiments shown in FIGS. 4a, 4b and 5. Assembly of the electrode unit may be carried out in the following sequence.
 1. Place main busbar in centre of main inlet or main outlet hole.
 2. Thread sub-busbars into main busbar.
 3. Glue in tube seals if walls not notched or stepped.
 4. Push in tube seals if walls notched or stepped.
 5. Push in electrode elements to give correct protrusion.
 6. Plug rest of holes with plastic rods.
 7. Glue or push in water inlet (15) and outlet (16) connectors according to condition of wall.
 8. Thread in power plug in connector.
 9. Cast heat shield (14) with a castable ceramic.

Even though the main inlet and outlet channels can be drilled from one of the side faces it is preferred to drill these channels from opposite side faces. Also, even though the branch inlet and outlet channels can be drilled from the opposite end faces it is preferred to drill both of these channels from the same end face as illustrated in FIGS. 4b and 5.

It will be understood that the described embodiments are exemplary only, and that other variations of the structure may well be possible. The invention includes all such variations as would occur to one skilled in the art and is delineated not by the preceding examples but solely by the appended claims.

I claim:

1. A self-optimizing electrode assembly for a high power gas laser comprising:
 (a) a plurality of electrical energy conducting electrode elements physically and electrically separated from one another;
 (b) a heat resisting dielectric body in which said electrode elements are supported, one end of said electrode elements protruding from said dielectric body;
 (c) an inlet channel for transporting an aqueous solution into and through said dielectric body;
 (d) an outlet channel for transporting the aqueous solution through and out of said dielectric body;
 (e) a plurality of transverse channels corresponding in number with the plurality of electrode elements, each transverse channel surrounding at least a portion of its respective electrode, each channel connecting with the inlet channel and the outlet channel, each of said transverse channels isolating physically and electrically a respective end of an electrode element opposite the end of the electrode element protruding from the dielectric body;
 (f) at least one electric conductor spaced from the ends of the plurality of electrode elements opposite the ends protruding from the dielectric body to form a series of gaps, the conductor being used for distributing electrical energy to the plurality of electrode elements; and
 (g) means for transporting an electrical energy conducting aqueous solution through the inlet, transverse and outlet channels.

2. An electrode assembly as claimed in claim 1 wherein said electrode elements are arranged in rows in one direction, in columns in a second direction, and each of said electrode elements extending in a third direction to form thereby a 3-dimensional array.

3. An electrode assembly as claimed in any one of claims 1 or 2 wherein said electrode elements are rods.

4. An electrode assembly as claimed in any one of claims 1 or 2 wherein said electrode elements are tubes with closed protruding ends.

5. An electrode assembly as claimed in any one of claims 1 or 2 wherein said electrode elements are open-ended tubes, each of the ends of each tube being connected to one of said channels whereby a portion of said electrolyte circulates through said tubes.

6. An electrode assembly as claimed in claim 1 wherein said channels comprise
 a main inlet channel and a main outlet channel,
 a plurality of branch inlet channels and
 a corresponding plurality of branch outlet channels connected to said main inlet and main outlet channels respectively, a plurality of transverse channels connected between each branch inlet channel and the corresponding branch outlet channel, thereby being a transverse channel corresponding to each electrode element, and a portion of each of said electrode elements being located in the corresponding transverse channel and being so located with respect to one of said electrical conductors as to provide therebetween a gap of predetermined width whereby the electrolyte provides requisite ballasting resistance for each electrode element.

7. An electrode assembly as claimed in claim 6 wherein said electrical conductors comprise a main busbar extending longitudinally within said main outlet channel and a plurality of sub-busbars, electrically connected to said main busbar, corresponding in number to said plurality of branch outlet channels and extending longitudinally therewithin, each of said electrode elements being so located with respect to one of said sub-busbars as to produce therebetween one of said gaps.

8. An electrode assembly as claimed in claim 7 wherein each electrode element extends transversely through one of said branch inlet channels and thereacross into one of said transverse channels.

9. An electrode assembly as claimed in claim 7 or claim 8 wherein the widths of said gaps increase from the gas upstream ends of said sub-busbars to the downstream ends thereof.

10. An electrode assembly as claimed in any one of claims 6, 7 or 9 wherein each of said electrode elements is positioned in relation to the corresponding sub-busbar so as to provide a gap of predetermined resistance.

11. An electrode assembly as claimed in any one of claims 6, 7 or 8 wherein the transverse channels are arranged so that the electrolyte flow rate through each is substantially the same.

12. An electrode assembly as claimed in any one of claims 6, 7 or 8 wherein said electrode elements protrude above the heat shield plate a distance in the range 4 to 10 mm.

13. An electrode assembly as claimed in any one of claims 6, 7, or 8 wherein the direction of flow of the electrolyte in the vicinity of the electrode elements is such that bubbles formed at the electrode elements at the ends opposite the protruding ends are carried away to the outlet channel.

14. An electrode assembly as claimed in claim 6 wherein said electrical conductors comprise a main busbar extending longitudinally within said main inlet channel and a plurality of sub-busbars, electrically connected to said main busbar, corresponding in number to said plurality of branch inlet channels and extending longitudinally therewithin, each of said electrode elements being so located with respect to one of said sub-busbars as to produce therebetween one of said gaps.

15. An electrode assembly as claimed in claim 14 wherein each electrode element extends transversely through one of said branch outlet channels and thereacross into one of said transverse channels.

16. An electrode assembly as claimed in claim 6 wherein said dielectric block is a parallel-piped having first and second major faces and a pair of end faces and a pair of side faces joining the major faces, the electrode ends protruding through the first major face, a heat shield plate being located adjacent said first major face, said electrode elements extending from within said dielectric block and through the heat shield.

17. An electrode assembly as claimed in claim 16 wherein said main outlet channel and said plurality of branch outlet channels are located adjacent and substantially parallel to one of said major faces, said main inlet and said plurality of branch inlet channels are located adjacent and substantially parallel to the other of said major faces, and said transverse channels extend between said branch inlet and said branch outlet channels substantially perpendicular to said major faces whereby a 3-dimensional array of water channels is provided.

18. An electrode assembly as claimed in claim 6 wherein said outlet channel and said plurality of branch outlet channels are located substantially in the first plane, said main inlet and said plurality of branch inlet channels are located substantially in a second plane, said transverse channels extend between said branch inlet and said branch outlet channels, said first and second planes are slightly tilted with respect to one another to provide a gradual water gap increase between the electrode elements and the sub busbars toward the gas downstream portion of said electrode assembly.

19. An electrode assembly as claimed in any one of claims 1, or 2 wherein said electrode elements protrude above the heat shield plate a distance in the range 4 to 10 mm.

20. An electrode assembly as claimed in claim 1 wherein said electrode elements are spacially arrayed in two directions in the dielectric body.

21. An electrode assembly as claimed in claim 20 wherein the electrode elements are arranged in the form of a grid parallel with the broad faces of the dielectric body.

22. An electrode assembly as defined in claim 1 wherein the width of the gaps between the electrode elements and conductor at the gas upstream region is less than the width of the gaps between the electrode elements and conductor at the gas downstream region.

23. An electrode assembly as defined in claim 1 wherein the electrode elements are hollow tubes, one end of each of the tubes connecting with the inlet channel, the opposite end of each of the tubes connecting with the outlet channel.

24. An electrode assembly as defined in claim 23 wherein the tubes are bent and the ends of the bent tubes connecting with the inlet channel are in one row in the dielectric body and the ends of the bent tubes connecting with the outlet channel are in a second row in the dielectric body.

25. An electrode assembly as claimed in claim 23 wherein said outlet channel is accompanied by and connected with a plurality of brach outlet channels, all of which are located substantially in a first plane, said inlet channel is accompanied by and connected with a plurality of branch inlet channels, all of which are located substantially in a second plane, the transverse channels extending between said branch inlet and said branch outlet channels, said first and second planes being tilted with respect to one another to provide a gradual water gap increase between the electrode elements and the conductor in the direction of the gas downstream portion of the electrode assembly.

26. A self-sustained D.C. glow discharge system for a high power gas laser comprising:
   a cathode electrode and an anode electrode, at least one of said cathode and said anode electrodes being an electrode assembly including
   (a) a plurality of electrical energy conducting electrode elements physically and electrically separated from one another;
   (b) a heat resisting dielectric body in which said electrode elements are supported, one end of said electrode elements protruding from said dielectric body;
   (c) an inlet channel for transporting an aqueous solution into and through said dielectric body;
   (d) an outlet channel for transporting the aqueous solution through and out of said dielectric body;

(e) a plurality of transverse channels corresponding in number with the plurality of electrode elements, each transverse channel surrounding at least a portion of its respective electrode, each channel connecting with the inlet channel and the outlet channel, each of said transverse channels isolating physically and electrically a respective end of an electrode element opposite the end of the electrode element protruding from the dielectric body;

(f) at least one electric conductor spaced from the ends of the plurality of electrode elements opposite the ends protruding from the dielectric body to form a series of gaps, the conductor being used for distributing electrical energy to the plurality of electrode elements; and (g) means for transporting an electrical energy conducting aqueous solution through the inlet, transverse and outlet channels said anode and cathode electrodes extending in spaced relationship to one another to define therebetween a discharge volume, means for producing a continuous flow of a gas suitable for laser action through said discharge volume, an optic system including a set of mirrors located at both ends of said discharge volume, means for initiating and stabilize the glow discharge in said volume, a sustainer D.C. supply having positive and negative output terminals, a pair of pulse isolation inductors, one of the pulse isolation inductors being electrically connected between the positive terminal of the D.C. supply and the anode, the other pulse isolation inductor being electrically connected between the negative terminal of the D.C. supply and the cathode, a capacitor, electrically connected between one of the output terminals of a pulser of said system and one of said electrodes, the second output terminal of the pulser being electrically connected to the other of said electrodes.

27. A self-sustained glow discharge system as claimed in claim 12 wherein the pulse repetition rate of the pulser is in the range 1 to 5 KHz.

28. A self-sustained glow discharge system as claimed in any one of claims 26, 27 or 25 wherein an expansion chamber is located on the downstream side of the discharge volume to suppress the streamer of electrons.

29. A self-sustained glow discharge system as claimed in claim 26 wherein the gas is $CO_2$ laser mixture.

30. A self-sustained glow discharge system as claimed in claim 26 wherein said electrode elements protrude beyond said heat shield into the discharge volume.

31. A self-sustained glow discharge system as claimed in claim 26 or 23 wherein said electrode elements are open-ended tubes, both ends of each tube being connected to one of said channels whereby a portion of said electrolyte circulates through said tubes.

* * * * *